Dec. 6, 1966 E. H. YONKERS 3,290,428
METHOD AND APPARATUS FOR CABLE CONNECTION
Original Filed Oct. 3, 1961 4 Sheets-Sheet 1
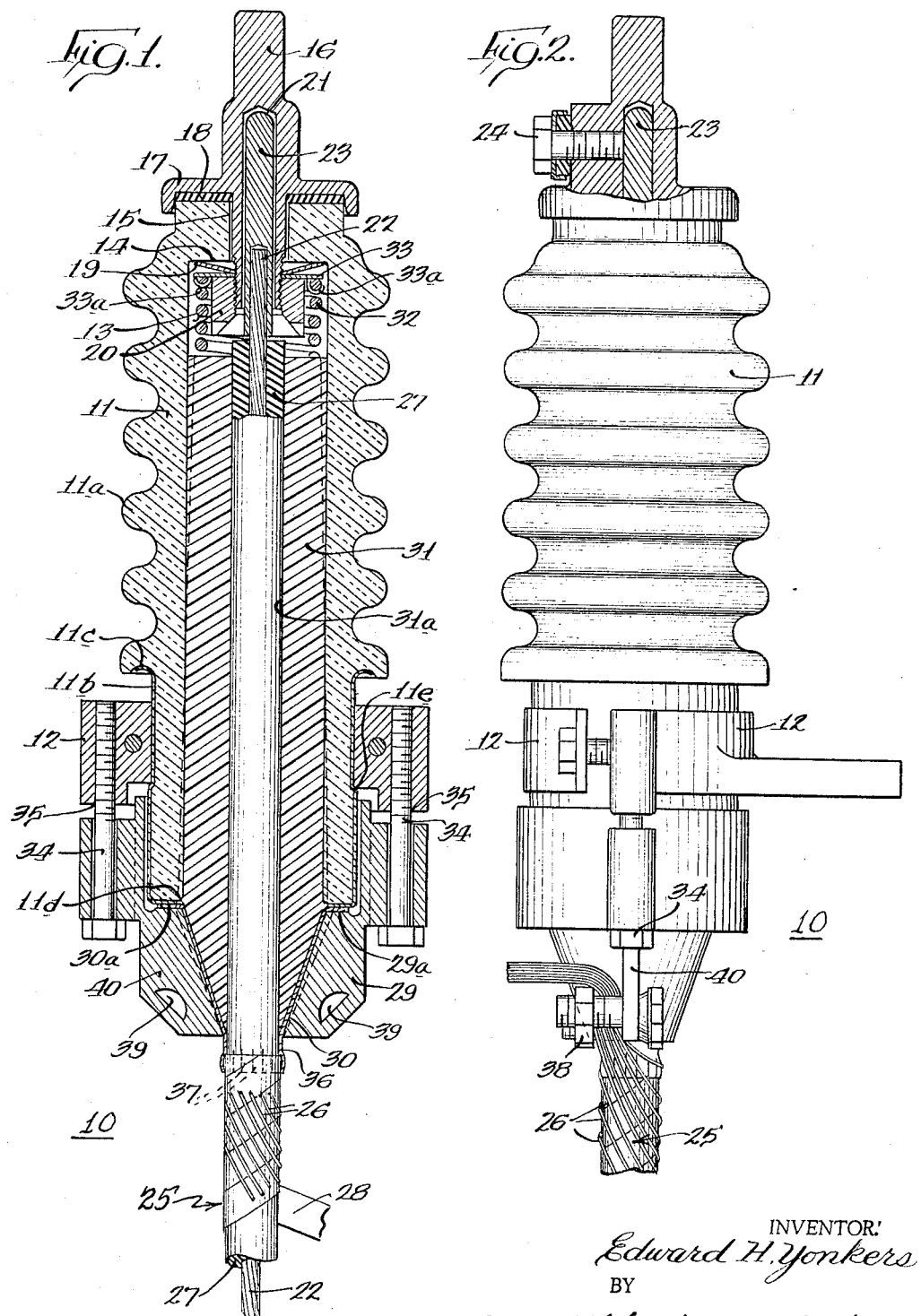
INVENTOR:
Edward H. Yonkers
BY
Mason, Kolehmainen, Rathburn & Wyss
Attys Dec. 6, 1966          E. H. YONKERS          3,290,428
METHOD AND APPARATUS FOR CABLE CONNECTION
Original Filed Oct. 3, 1961          4 Sheets-Sheet 2
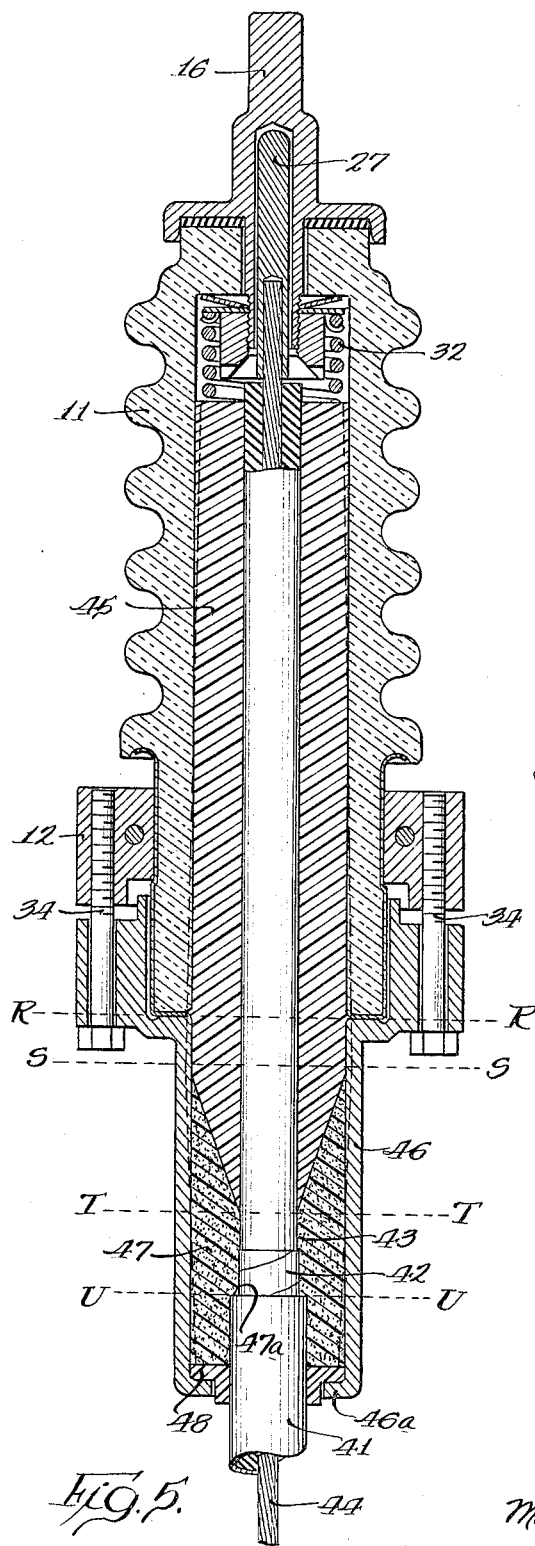
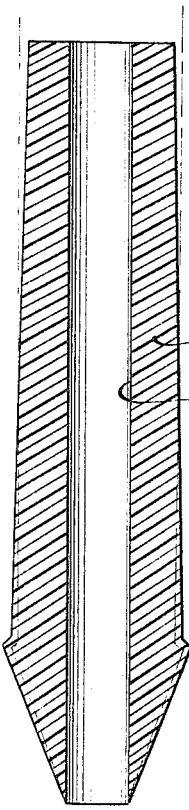
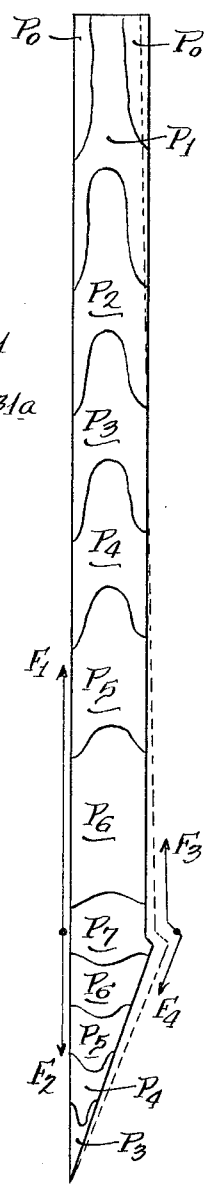
INVENTOR:
Edward H. Yonkers
BY
Mason, Kolehmainen, Rathburn & Wyss
Att'ys Dec. 6, 1966 E. H. YONKERS 3,290,428
METHOD AND APPARATUS FOR CABLE CONNECTION
Original Filed Oct. 3, 1961 4 Sheets-Sheet 3
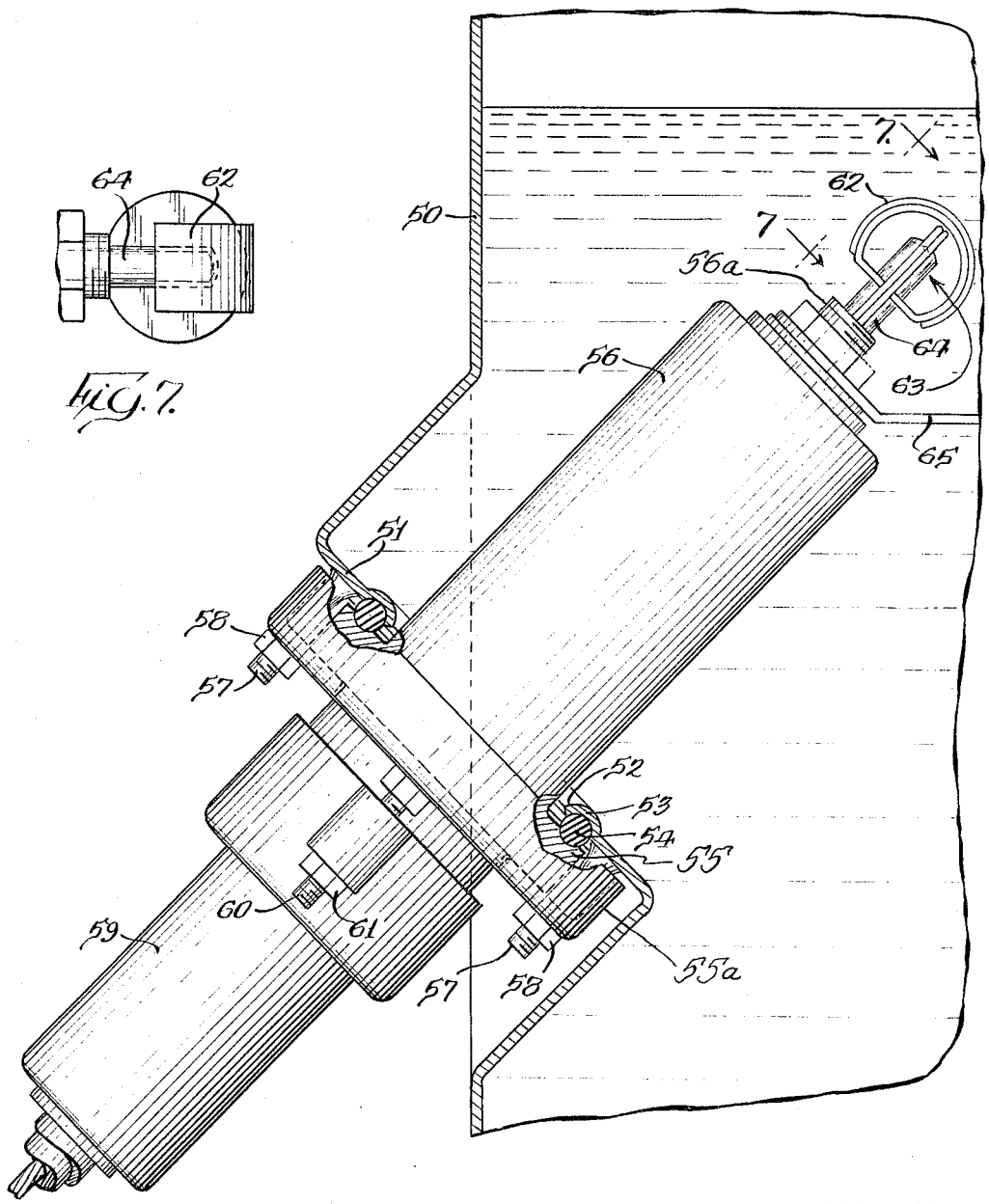
INVENTOR.
Edward H. Yonkers
BY
Mason, Kolehmainen, Rathburn & Wyss
Atty's

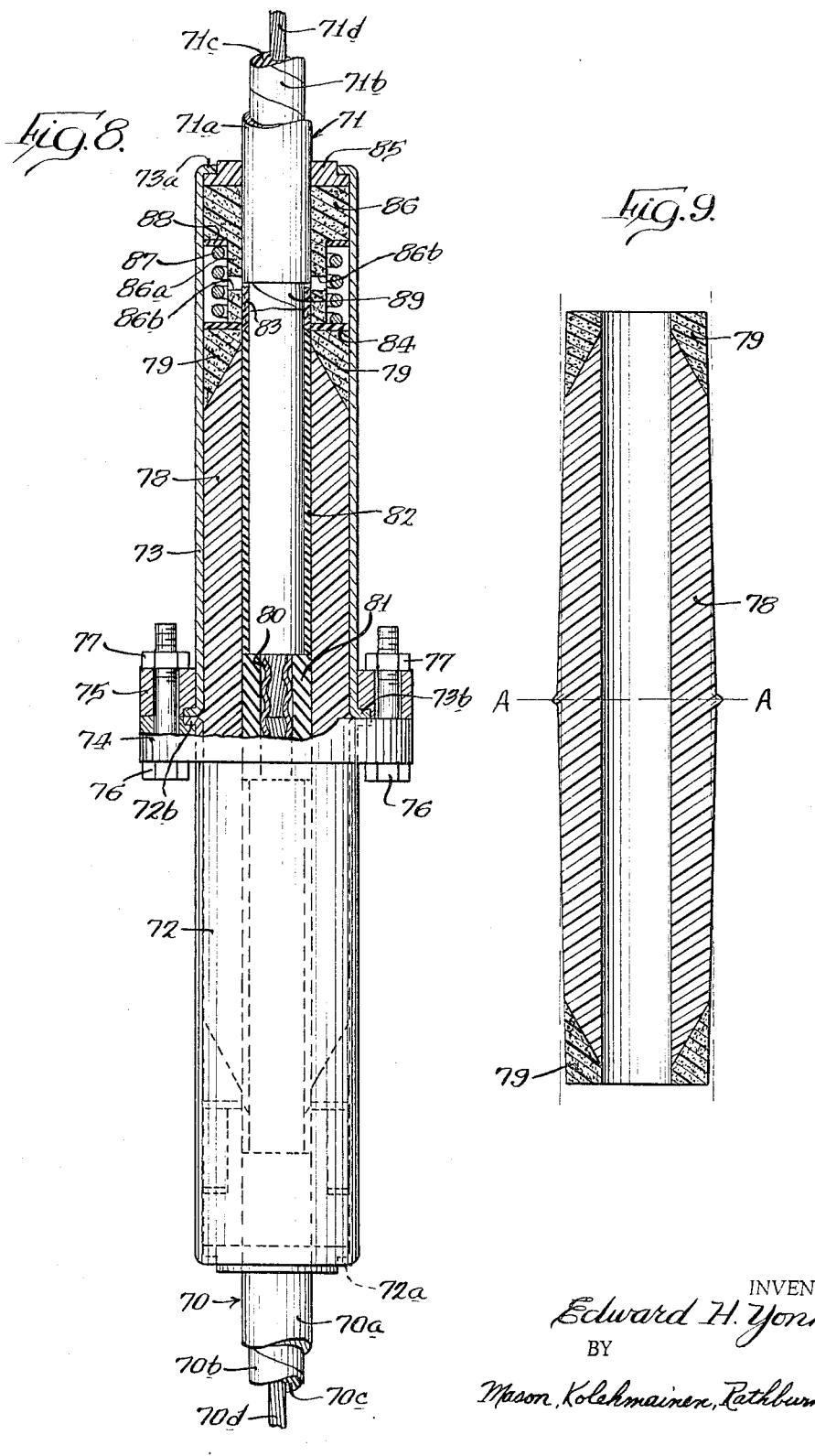

United States Patent Office 3,290,428
Patented Dec. 6, 1966

3,290,428
METHOD AND APPARATUS FOR CABLE CONNECTION
Edward H. Yonkers, Glencoe, Ill., assignor to Joslyn Mfg. and Supply Co., Chicago, Ill., a corporation of Illinois
Continuation of application Ser. No. 142,562, Oct. 3, 1961. This application Mar. 29, 1965, Ser. No. 446,774
13 Claims. (Cl. 174—73)

This application is a continuation of United States patent application Serial No. 142,562, and now abandoned, filed October 3, 1961.

The present invention relates generally to a method and apparatus for terminating high voltage cables and, more particularly, to a new and improved method and apparatus for accomplishing the air-free seal and dielectric stress control required in such terminations.

There is presently an increasing trend toward the transmission and distribution of electric power by means of underground cables in order to avoid the undesirable features of overhead lines. Furthermore, in order to transport the ever increasing quantity of electrical energy demanded, it becomes necessary to convey it at higher and higher voltages.

Coaxial power cables having a central conductor surrounded by insulation and an outer conducting sheath have been extensively employed in the underground transmission of electrical energy. Such cables must be terminated in order to make necessary connections to sources, loads, switch gear, etc. Cable terminations operating at voltages above 5000 give rise to several problems which become more severe as the operating voltage is increased. First, the conducting sheath must be removed for some distance from the actual terminal in order to expose sufficient dielectric or insulation to control surface leakage and to prevent flashover. This exposed dielectric structure should be comparable in insulation value to the basic insulation level of other equipment to which the cable is connected.

Secondly, in the region where the conducting sheath is discontinued, the insulation and the air surrounding it are subjected to electrical gradients which may be sufficiently high to produce corona. The term corona refers to a condition involving ionization of gas molecules, ultraviolet radiation and the formation of ozone, all of which are deleterious to cable insulation. Corona is also undesirable because it is a source of radio interference.

These cable terminating problems have been handled up to the present time by employing "stress relief cones" and air-excluding compounds in metal and dielectric housing known as "potheads." The term "stress cone" or "stress relief cone" refers to an axially symmetrical conical increase in the diameter of insulation and conducting sheath preparatory to termination so that at the end of the sheath cone the thickness of the insulation between conductor and sheath is sufficient to maintain potential gradients at tolerable levels. In accordance with present practice, these "stress cones" are formed by hand-wrapping an insulating material over a portion of the cable periphery prior to insertion into the terminal housing. The housing is filled with an air-excluding compound after the "stress cone" has been inserted. Hand-wrapped stress cones and compound filled potheads in wide use at the present time are relatively high in cost and, in addition, their installation is both difficult and time-consuming.

Therefore, it is an object of the present invention to provide new and improved cable terminating means which avoid the disadvantages of the prior art discussed above.

Another object of the invention is to provide a new and improved cable terminating structure for grading electrical stress at the end of a cable used in the transmission of high voltages.

A further object of the invention is to provide a new and improved cable terminating structure including a built-in stress cone and air-excluding corona-free sealing system to provide simple and rapid installation as well as uniform long-term performance.

The invention has for a further object the provision of a new method for terminating a cable rapidly and inexpensively.

The invention has for another object the provision of a new and improved method for terminating a cable very simply so that even unskilled installers may be trained very easily to perform the installation.

It is also an object of the invention to provide a new and improved cable terminating means which may be simply and rapidly installed but which will, at the same time, accommodate a range of cable sizes while utilizing a minimum number of variable components.

The invention has for an additional object the provision of new and improved apparatus for splicing the ends of a pair of cables.

Another object of the invention is to provide a new method for splicing the ends of a pair of cables very easily and very rapidly.

The invention has for a further object the provision of a new and improved apparatus for use in connecting the terminal end of a cable to a contact disposed internally of a closed housing as, for example, a contact located within an oil-filled transformer of the type conventionally used in power distribution.

The invention has for another object the provision of a new and improved apparatus for making an electrical connection to a contact disposed within a closed housing from the exterior and without opening the housing.

A further object of the invention is to provide a new method for simply and rapidly connecting the terminal end of a cable to an internal contact located within a closed housing, such as the housing for an oil-filled transformer.

While the present invention is particularly suited for concentric plastic insulated cables in the range of electric power distribution voltages, it may be adapted to other forms of cable and other voltages.

In order to accomplish the foregoing and other objects of the present invention, apparatus is provided comprising first and second concentric interfitting members. The first members is a preformed, resilient member positioned over the cable insulation near its end in an intimate air-excluding relationship. When the apparatus of the present invention is used for cable termination, the outer form of the first member is that of a cone coaxial with the cable conductor and expanding symmetrically around the cable from the point of termination of the conducting sheath. This expansion continues at a predetermined rate until the diameter of the first member is greater than the diameter of a cylindrical cavity formed in the second member, which is constructed of rigid material. When the apparatus is used for terminating a cable, the second member takes the form of a housing of dielectric material such as porcelain, but in other forms of the invention the second member may comprise a rigid metal housing. In the cable termination structure, the conical end of the first member extends beyond the end of the housing and the diameter of the first member decreases along the axis from its maximum diameter region at a much smaller rate than the expansion along the conical end so that its outside diameter becomes somewhat less than the diameter of the cavity in the second member. The first member is constructed of a dielectric elastomer which is readily deformable under pressure but which returns to its original form when the pressure is removed.

A metallic end fitting is operatively associated with the first and second members in a manner which forces the first member into complete interfacial conformity with the second member as well as with the conducting end fitting. The geometrical shapes and disposition of these parts around the cable exclude air and control potential gradients to toyerable levels by simply forcing the parts to meet and securing them in their final positions. An internal spring provides a permanent force on the elastic member so as to maintain the air-free interfacial contacts under all normal operating conditions.

The invention, both as to its construction and manner of operation, together with further objects and advantages, will best be understood by reference to the following detailed description taken in conjunction with the accompanying drawings in which:

FIG. 1 is a sectional view of a cable terminating device characterized by the features of the present invention, the section being taken along a plane containing the longitudinal axis of the terminated cable;

FIG. 2 is a side view of the device shown in FIG. 1 with the upper end being shown in section and partly broken away to illustrate certain details of construction;

FIG. 3 is an axial sectional view of one form of elastomer or elastic filler element used in the present invention with the cooperating portions of the cable terminating structure being shown in phantom in order to clarify the explanation;

FIG. 4 is a diagrammatic view of a portion of the filler element shown in FIG. 3 and illustrates the pressure contours in the element after installation;

FIG. 5 is a longitudinal, sectional view similar to FIG. 1 but shows another form of the invention particularly adapted for use in the termination of cables employing a continuous external conducting sheath;

FIG. 6 is a fragmentary, sectional view showing an adaptation of the form of the invention shown in FIG. 5 for permitting a cable to be terminated directly into a transformer housing;

FIG. 7 is a fragmentary view looking in the direction of the arrows 7—7 in FIG. 6;

FIG. 8 is a partially sectional view showing a form of the invention for making cable junctions or "splicing"; and FIG. 9 is a sectional view taken along a plane passing through the longitudinal axis of the elastic member shown in FIG. 8 outside of the confining walls of the metal housing, the member being shown in solid lines in its unstressed condition and being shown in broken lines in its stressed condition.

Referring now to the drawings and first to FIGS. 1 and 2, a cable terminating device 10 characterized by the features of the present invention is there shown including a housing member 11 constructed of rigid insulating material, such as porcelain or the like. The housing 11 is of a generally cylindrical shape with the upper portion of its outer surface provided with periodic horizontal enlargements 11a for increasing the insulating value of the outer surface. The lower outer surface of the housing 11 carries a conducting glaze 11b from point 11c to point 11d for the purpose of eliminating radio interference due to inadequate contacts between the porcelain housing and the metal parts associated with it. A small annular recess 11e, formed in the periphery of the lower housing portion 11b receives an annular metallic split ring 12 which serves as a mounting support and electrical ground for the housing 11. The inner surface of the housing 11 forms an elongated, axially disposed cylindrical chamber 13. An integrally formed upper end wall 14 is provided with a centrally disposed aperture 15 so that the cable circuit may be carried to an upper connection terminal 16. The terminal 16 is provided with a flange 17 cooperating with a gasket 18, a resilient (Belleville) washer 19 and a nut 20 to provide an effective seal around the terminal 16. The terminal 16 is also provided with an axial bore 21 extending only partially therethrough for receiving a cable conductor 22 or an extension 23 thereof. The latter extension may take the form of a short rod having a hollow lower end telescoping over the exposed upper end of the conductor 22. As is shown in FIG. 2, a self-sealing clamping bolt 24 is threaded into the upper portion of terminal 16 to secure the cable conductor extension 23 to the terminal 16 both electrically and mechanically.

The cable 25 shown entering the lower end of the housing 11 is of the type which is termed "concentric" due to the fact that its neutral circuit is carried on its outer surface in the form of 12 or 14 turned copper wires 26 wound spirally with uniform spacing between wires. The cable conductor 22 lies in the center and is symmetrically surrounded first by an insulating layer 27 and then by a conducting or semiconducting tape 28 which is wrapped over the insulation layer before the neutral conductors 26 are applied. The conducting tape 28 makes intimate and continuous contact with the outer surface of the insulation thereby preventing the formation of corona, which might occur if the spaced neutral wires were wound directly over the cable insulation.

In the application of the cable termination of the present invention to a cable of the type shown in FIGS. 1 and 2, it is necessary to prepare the cable end so that it will be of the proper length to engage and be secured by the clamping bolt 24. Moreover, in order to assure uniformity and precise fit, the cable insulation is bared and cleaned for a predetermined distance. This operation includes unwrapping the neutral conductors 26 and the conducting tape 28. The cable insulation 27 is then removed for a predetermined distance at the end of the conductor and the conductor 22 is press-fitted into the uniform diameter extension rod 23. A lower compression fitting 29 is then slipped over the bared cable insulation. This is followed by a soft metal cone 30. Next, the clean surface of the cable insulation is coated with a dielectric grease preferably a silicon material which retains uniform viscosity over a wide range of ambient temperature. Next, an elastic filler 31 is slipped in place over the cable with its conical end downward so as to engage the soft metal cone 30. The outer surface of the filler 31 is also coated with silicon grease.

In order to accommodate a range of different sized cables with a minimum of variable components, the porcelain housing 11 and all of its fittings remain the same for the selected range. Variations in conductor size are taken care of by attaching the uniform extension rod 23 to the conductor before insertion in the housing. The housing 11 may thus be factory assembled as shown to include a compression spring 32 which is held permanently in place at the upper end of the cylindrical housing chamber 13 by means of a brass washer 33 clamped between the nut 20 and the Belleville washer 19. The washer 33 is provided with fingers 33a embracing the upper turn of the spring 32 to hold the latter in position.

When the cable carrying the filler 31 and the associated lower metal fittings has been prepared in the manner described above, it is ready for installation in the porcelain housing 11. It should be noted that the filler is provided with an axial bore 31a dimensioned to fit the outside diameter of the cable insulation 27. Moreover, the lower end of the metal cone 30 extends downward for some distance in cylindrical form 36 just fitting the outside diameter of the cable insulation. The lower portion of this cylinder 36 is cut into strips 37 extending parallel to the axis of the cable. In practice, the semiconducting tape 28 is cut off so as to terminate in the region of the metal strips so that the strips may be pressed down over the end of the tape to prevent it from unwinding and also make the necessary electrical connection to the tape so as to provide the necessary continuous electrostatic shield. The cone 30 is provided at its upper end with an annular flange 30a adapted to be held between the fitting 29 and the lower end of the housing 11. It will be obvious that the filler 31 and the metal cone 30 must be selected to meet the range of cable sizes encountered in the field. However, these are the only part in this form of the invention which vary with the size of the cable.

The outside form of the filler 31 remains the same for all cable sizes since it must fit the inside diameter of the housing 11 and provide complete air-free interfacial contact between the housing and the cable insulation and also with the soft metal cone 30 at the lower end. Heretofore, liquids or potting compounds have been employed in order to achieve this condition. By the present invention, this necessary condition is accomplished by simpler, more economical and more effective means, and it is in these means that the most significant features of the invention reside.

Referring now to FIG. 3, a cross section of the filler 31 is there shown with the broken representing the outlines of the porcelain housing 11 and the soft metal cone 30 as they occur in the section through the axis. It should be noted that at the junction of the lower end of the housing 11 and the upper flange 30a of the cone 30 the filler is larger in diameter than the inner diameter of the housing and the base of the cone. It should also be observed that the upper end of the filler is slightly smaller in diameter than the inner diameter of the housing 11. By control of these dimensions relative to one another in coordination with the hardness of the elastic material of the filler and the stiffness of the compression spring 32, a sysem is provided for wiping out air pockets from all critical interfaces to achieve a permanent air-free seal as required.

In detail, this system functions as follows. The cable with the filler 31 and other fittings as described above is inserted into the lower open end of the chamber 13 in the housing. 11. The filler 31 is pressed upward until a set of tensioning bolts 34 enter a corresponding group of tapped bores 35 formed in the clamping ring 12. At this point, the cable filler assembly is about an inch and one-quarter from its final position shown in FIG. 1. Since the outside diameter of the filler exceeds the inside diameter of the housing in the region near the lower end of the housing, the filler is pressed inwardly against the cable insulation in the central region of the filler. The initial engagement of the periphery of the filler with the inner surface of the housing 11 causes air-free contact to occur between all surfaces in the region of maximum diameter of the filler. The pressure in the body of the filler 31 remains moderate since the upper end is free to elongate until it contacts the compression spring 32.

The bolts 34 are next threaded into the respective bores 35 and as these bolts are progressively drawn up, the upper end of the filler soon presses against the spring 32. The resulting end thrust on the filler causes the line of contact between the maximum diameter region of the filler and the housing to move progressively upward carrying with it air and any grease that may be present. The same thing happens along the inner diameter of the filler in the area of engagement between the filler and the cable insulation due to the pregressive increase in wall pressure with progressively increasing compression arising from the spring 32. Now, as was noted above, the conical portion of the filler is larger in diameter than the metal cone 30 in the region of the flange 30a and the filler has a steeper slope than the metal cone 30, the metal cone in one form of the invention being 20° and the filler cone 21½° to 22°. This causes the region of contact between the filler and the metal cone to proceed progressively from the region of the flange 30a downward to the end of the metal cone carrying with it air and excess grease. The bolts 34 are turned into the bores 35 until the flange 30a of the metal cone meets and is sealed against the porcelain housing and the flange is forcibly backed by an inner land 29a on the fitting 29.

This is the final position of the system and at this point all the required surfaces are in intimate air-free contact through a film of silicon grease. The spring 32 is compressed as required to take up tolerances occurring in the various parts and to provide the additional range required for any expansion and contraction of the parts caused by ambient temperature variations. In the practice of the invention, it has been found that for an elastic material with a hardness of 35 to 40 (Shore A) and a filler taper from 6½% in excess of the inner diameter of the housing 11 at the maximum diameter point of the filler of 6% less than the inner diameter of the housing 11 at the upper end of the filler and with the lower cone of the filler having a 22° slope against a metal cone of 20°, the compression spring 32 must exert a total force against the upper end of the elastic filler in the range 70 to 90 lbs. With a Shore hardness of 25 to 30 in the elastic filler, the required spring force is 65 to 70 lbs. These design parameters, that is, hardness of the elastomer and the differential geometry of filler with respect to housing and spring force, may vary widely to fit the needs of the many possible useful applications of the filler operation described above.

The nature of the forces in the elastic filler which makes it possible to accomplish the unusual function of progessive interfacial contact for excluding air will be more clearly understood by reference to the diagrammatic view of FIG. 4 which shows in solid lines the outline of one section of the filler after it has been pressed into final position in the housing. The relaxed outline of the filler is shown in broken lines for comparison. The curved lines crossing the body of the filler area designate contours defining pressure zones, the letters $P_1$, $P_2$, $P_3$ designate pressure ranges increasing in relative value in proportion to the subscript numbers. Thus, the central region where the interference between the housing and the filler is maximum shows the maximum pressure region $P_7$. The pressure regions decrease both ways from this area reaching the minimum at the upper end. It should be noted that the pressure at the contact area with the compression spring is less than the pressures in the central regions even after the system has been drawn up to its final position. This is possible because the tensile forces set up in the elastic filler by the displacements necessary to conform to the housing generate additional pressure in these regions where the displacements occurred. The extent and direction of the internal displacements and the direction of tensile forces are suggested by the contour lines.

The series of pressure regions indicated are confined by the cable insulation on the inside and the porcelain housing and metal cone on the outside with the maximum pressure zone $P_7$ as shown. These wall pressure variations produce forces acting on fluid materials such as air or grease in the interfacial regions causing them to move along the interfaces away from the maximum pressure regions. These forces have directions indicated by the arrows $F_1$, $F_2$, $F_3$ and $F_4$ in FIG. 4.

In practice, it has been found that excess grease continues to be expelled by this process for hours after the assembly of the components. The complete expulsion of air and the continued slower explusion of excess grease by this process has been clearly demonstrated by the use of transparent components.

After the bolts 34 have been threaded into the bores 35 sufficiently to complete the interfacial contact between the filler, the housing 11, the cone 30 and the cable insulation as described above, the external spiral system of neutral wires 26 is rewrapped over the cable and the wires may be neatly and securely fastened by standard split bolt connectors 38 acting through preformed apertures 39 defined in a pair of diametrically opposed flanges 40 on the lower fitting 29. Thus, the final assembly provides all of the requirements for ideal cable termination. The insulation and its shield expands gradually through the meal cone to the conducting glaze on the porcelain housing and the insulation within the shield expands in exact conformity with air-excluded interfaces in all critical regions. The final diameter of the stress relief system which is at the upper end of the conducting glaze on the outside of the housing 11 is so large that operating potential gradients are well below corona-forming values.

There are other forms of cable which employ continuous sheaths of lead and other forms of cable insulation requiring oil and moisture-tight sealing between the sheath and the terminal housing. This requirement introduces additional problems which have been solved by significant modifications in the form of the device shown in FIGS. 1 and 2, but these modifications still embody the principal features of the present invention. Thus, there is shown in FIG. 5, cable terminating structure for use with a cable having a continuous, outer lead sheath 41, a conducting or (semiconducting) tape 42, cable insulation 43 and a central cable conductor 44. In the termination of the latter cable, all preparations including the connection to the central conductor to the upper terminal are the same as those for the form shown in FIGS. 1 and 2 and, to simplify the description, corresponding parts have been assigned the same reference numerals. It will thus be obvious that all features of the cable terminal housing upper fittings, mounting clamps, etc., are identical to the form shown in FIG. 1. The differences occur in the lower portion of the terminal starting at the lower end of the porcelain housing 11 designated by the line R—R. It will be noted that above this line the elastic filler 45 is the same as in FIG. 1 and, in the unstressed condition shown by the dotted lines, has the same 6½% oversize diameter at the line R—R and the same 6% undersize diameter a tthe upper end of the filler 45. The filler 45 in this case remains at the oversize diameter downward to the line S—S. The lower end of the dielectric elastic filler 45 tapers conically at 20°, the same as in the form of FIG. 1. This taper starts at the line S—S and ends at the line T—T where the taper slope meets the outside diameter of the cable insulation. In place of the metal cone used in the form shown in FIG. 1, there is provided a somewhat cylindrical sleeve 47 of conducting plastic of the same hardness as the fillers 45 and having its upper end recessed to match exactly the lower conical end of the dielectric filler 45. The inside diameter of the conducting plastic sleeve 47 starts at its upper end at the same inside diameter as the filler 45, that is, the diameter of the cable insulation 43. The inside diameter of the sleeve 47 is enlarged at a predetermined distance from the junction of the elements 45 and 47 to receive the cable sheath 41 at the line U—U. A hard plastic insert 48 is placed in the lower end of the lower fitting 46 and this insert is dimensioned to fit closely over the sheath 41. To this end, the lower end of the fitting 46 is turned in to form a rim 46a for supporting an annular ring on the insert 48 and the lower cylindrical portion of the insert extends through an annular space formed between the ring 46a and the outer sheath of the cable.

In practice, the dielectric filler 45, the conducting plastic sleeve 47 and the insert 48 are assembled and cemented together so as to constitute a functional unit and these parts are selected to fit the desired cable size. All other parts of the terminal are the same for any size cable of this type within the selected range. The periphery of the sleeve 47 tapers slightly from the line S—S where its outer diameter is equal to the maximum diameter of the filler 45 and at its lower end the sleeve has an outer diameter about 6% less than the inner diameter of the fitting 46.

The installation of the terminal shown in FIG. 5 is even simpler than that shown in FIG. 1. The sheath 41 is stripped off to a predetermined distance from the cable end. The conducting tape 42 is removed for a distance of ¼ inch to ½ inch less than the sheath so that it will contact the conducting plastic sleeve 47. The conductor 44 is exposed by removing the insulation for a predetermined distance at its upper end and the connector rod 23 is installed as before. The fitting 46 is placed over the cable by inserting the end of the cable through the central opening formed by the rim 46a. The bared cable insulation is then cleaned and coated with silicon grease and the three piece, combined filler unit consisting of elements 45, 47 and 48 is slipped over the cable until the shoulder 47a in the inside of the sleeve 47 seats against the end of the cable sheath. The outside of the filler unit is then coated with silicon grease and the assembly with the cable is inserted in the housing 11 until the bolts 34 can be engaged with the tapped bores of the clamping ring 12. The clamping bolt 24 in the upper terminal 16 is preferably removed so as to observe the arrival of the connecting rod 23 at the required level for clamping. As the bolts 34 are drawn up, the system of interference between the combined filler unit and the housing 11 takes place and the compression spring 32 comes into action as described above to produce the complete air expulsion from all critical interfaces.

The bolts are drawn up so that the lower metal housing 46 presses firmly against the lower end of the porcelain housing at the line R—R. This is the final position of the system. Now as in the previous form, the entire filler unit is under compression due to the permanent end thrust force produced by the spring 32. As before, this force is of the order of 100 lbs. for elastic filler material in the range of 35 to 40 Shore A hardness and filler diameter differentials of plus or minus 6%.

The new feature introduced in the form of the invention shown in FIG. 5 is the use of the conducting plastic sleeve of the same order of hardness at the dielectric filler. The spring force acts permanently on all elements within the entire cylindrical chamber formed by the porcelain housing 11 and lower fitting 46. Thus, the elastic conducting sleeve 47 conforms to the cable sheath, the conducting tape and the bare cable insulation with pressure maintained permanently by the spring 32 through all ambient temperature variations. In this manner, all of the electrical requirements involving air-free interfaces and stress control are achieved as before but, in addition, a permanent elastic pressure seal is obtained between the cable sheath and the conducting plastic element 47, and furthermore, a simpler and more effective transition is achieved from the sheath through the conducting tape 42 to the conducting sleeve 47.

The form of the invention just described is particularly well suited to solution of the problem of terminating a cable directly into an oil-filled transformer. Thus, referring next to FIG. 6, there is shown a cable terminal similar to that shown in FIG. 5 but employing a modified porcelain housing entering into the oil of a transformer through an external wall 50 of the transformer tank. More specifically, the wall 50 is provided with an inclined portion 51 having a central opening 52 therein. A rolled rim 53 of annular shape extends around the opening 52 for the purpose of accommodating a seal ring 54 interposed between the support portion 51 of the transformer wall and a clamping ring 55 carried by the housing 56 of the cable terminating structure. The ring 55 has an annular groove defined in its upper face to receive the seal ring 54. A plurality of bolts 57 affixed to the support portion 51 extend through suitable openings in a clamping ring 55a and receive nuts 58 on their outer ends for attachment of the ring 54 and the housing 56 to the wall 50 of the transformer tank. The housing 56 has an inner cylindrical cavity like the housing 11 previously described and is adapted to receive the end of a sheathed cable like the one described above in connection with the form of the invention shown in FIG. 5. The preparation of the cable and the installation are identical to the process described in conjunction with the cable terminating structure shown in FIG. 3 and after this preparation is completed, the end of the cable is inserted into the housing 56 until it seats within a silver lined contact socket or chamber 64 formed by two halves of a diaphragmed connector 63 biased towards each other by a permanent high force band spring 62. The chamber or socket 64 receives the inner conductor of the cable or an extender rod mounted thereon, and this conductor can thus be pressed into position from the outside of the tank to make proper electrical connection to the connector 63 without opening the transformer tank. The diaphragmed connector 63 provides a seal against the flow of oil and, at the same time, the chamber 64 formed by this connector is somewhat cylindrical in shape to receive the end of the cable conductor or an extension rod carried thereby. The diaphragmed connector 63 and its associated spring 62 are mounted upon an upper terminal 56a of the housing 56 and a connection 65 is made from this terminal to the transformer. After the end of the cable conductor has been inserted into the chamber 64, it is clamped in position by the arms of the spring 62 and the lower end fitting 59 is then adapted to be drawn upon bolts 60 carried by the ring 51. The lower end fitting 59 is, of course, drawn onto the bolts 60 by tightening nuts 61 until a filler unit like that shown in FIG. 5 is forced into air-excluding interfacial contact with the cable, the interior of the housing 56 and the fitting 59. A spring (not shown) at the upper end of the housing 56 in the terminal again acts against the filler unit to provide the necessary force described above.

It is at times necessary to join a cable to another section of cable of the same kind by a connection sometimes referred to as a splice. A splice in high voltage cable encounters all of the problems of air exclusion, stress control and sealing. The basic features of the present invention lend themselves to solution of this difficult problem of splicing but require certain other important modifications in the form of the device as is shown in FIG. 8. The splice there illustrated is adapted to join together the ends of a pair of cables 70 and 71 which may be of the lead sheath-type described above. The splicing structure includes a pair of metal housings or fittings 72 and 73, respectively, slipped over the cables 70 and 71 and having inturned rims 72a and 73a, respectively, at the end defining a central cable receiving opening. The housings 72 and 73 are generally cylindrical with the same inner and outer diameters and are provided with outwardly turned annular flanges 72b and 73b, respectively, at their other ends. The latter flanges are adapted to be drawn together into abutment by means of a pair of clamping rings 74 and 75 cooperating with bolts 76 extending through aligned openings in the two rings to receive nuts 77. Disposed within the housings 72 and 73 is a double ended filler 78 of the same general elastic and dielectric properties as in previous forms of the invention above and shown in FIGS. 1, 2, 5 and 6. FIG. 9 shows an axial section of the main filler element 78 and its unstressed condition is illustrated in solid lines with its maximum outside diameter at the center line A—A and a progressively decreasing diameter toward each end. The filler 78 has an inside diameter fitting the sheath of the cables 70 and 71 to be spliced together and, as before, its maximum outer diameter at the line A—A is approximately 6% greater than the inside diameter of the housings 72 and 73 while the minimum outer diameter of the filler 78 at both of its ends is about 6% less than the inner diameter of the housings. The ends of the dielectric filler 78 are conical as before and are fitted with matching sleeves 79 of conducting plastic of the same order of hardness as the filler 78.

The other elements required for the cable splice system are an electrically conducting cable conductor connector 80, a split sleeve of dielectric plastic 81 to fill the gap between the ends of the cable insulation, a pair of dielectric sleeves 82, each having a conducting plastic sleeve 83 at one end, and a pair of stiff conducting end plates 84 respectively cemented to the opposed ends of the filler unit 78–79. A sheath fitting insert 85 passes through the central opening at the end of each housing and has an outwardly extending flange seating against the inturned flange 72a or 73a of its associated housing. The insert has a central opening just fitting the cable passing therethrough. A conducting plastic filler 86 seats against the inner face of the insert 85 and is provided with an annular recess 86a in its periphery to accommodate a stainless steel spring 87 which encircles the filler 86 and has its opposed ends respectively seated against the conducting plate 84 and a stiff end ring 88 inserted over the recessed portion of the filler 86. The ring 88 rests against a shoulder of the filler 86 formed by the recess 86a and serves to increase the contact pressure area of the spring. The filler has an axial bore closely fitting the cable.

In assembling a splice, the outer sheath 70a and 71a of each of the cables 70 and 71 is removed for a predetermined distance from the cable end; the conducting tape 70b and 71b of each cable is removed for a distance about one-quarter inch less than the outer sheath, thus leaving a small portion of tape extending beyond the end of the cable sheath as indicated at 89 in FIG. 8 on the cable 71; the cable insulation 70c and 71c of each cable is removed from the ends for a precise distance to expose just enough of the inner cable conductors 70d and 71d to accommodate exactly the connector 80 when the cable ends are placed in abutting end-to-end relationship. Both cables are treated in exactly the same manner. When this has been done, the housings 72 and 73 with their inner elements 85, 86, 87 and 88 in place are slipped over each cable some distance beyond the bared insulation. The bared insulations 70c and 71c of each cable are now cleaned and coated with silicon grease and the two sleeves 82 are then installed with their conducting plastic ends 83 carefully positioned to cover smoothly the ends of the conducting tapes in the area 89 extending a short distance beyond the sheath. The area of the sheath near the end of one of the cables is cleaned and coated with grease and the main filler unit consisting of joined elements 78, 79 and 84 is slipped over the cleaned area of sheath and is pushed well back onto the latter sheath. A thin plastic liner may be provided to protect the inside surface of the main filler unit during the insertion of this unit.

The exposed ends of the cable conductors 70d and 71d are next placed end to end by inserting them into the connector sleeve 80. The split dielectric sleeve 81 is snapped over the sleeve 81 with an excess of silicon grease. The outside surfaces of all sleeves 81, 82 and 83 are cleaned and coated with silicon grease and all have outer diameters approximately equal to the diameter of the central opening of the main filler unit which is now slipped into place symmetrically centered between the ends of the cable sheaths.

The two metal housings 72 and 73 are now moved into place over the filler unit and the coupling bolts 76 and their associated nuts 77 are assembled and drawn up tight. During the tightening of the nuts onto the bolts, the same process takes place that has been described under previous forms of the invention. The maximum pressure region is at the center and the air-excluding process takes place bilaterally in this case away from the central maximum diameter region. The air and excess grease will migrate to and remain in the void space around the compression springs. Several transverse openings 86b may be provided in the filler element 86 to facilitate the movement of air from the dielectric interfaces into the spring chamber. The force provided by the springs 87 acts to maintain the air-free interfaces as well as the seal to the sheaths at both ends in a manner which will be evident in view of the foregoing description. In this case, the elements 78, 79, 80, 81, 82, 83, 84, 85, and 86 must be selected to meet the specifications of the particular cable to which the splice is to be applied. The housings 72 and 73 will serve to cover a selected range of cable sizes without variation.

In carrying out all of the described forms of this invention, it has been found that satisfactory results can be obtained using dielectric elastomers of several types such as silicons, polyurethanes and neoprene. These same elastomers may be employed in providing the conducting elastic elements. However, the best results have thus far been obtained by employing polyurethanes for the dielectric elastic elements and polyvinyl chloride formulations for the elastic conducting elements.

While particular embodiments of the invention have been illustrated and described, it will be apparent that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In combination with an electrical cable, apparatus for terminating the end of said cable comprising a removable, preformed, tubular elastic filler having a longitudinal bore and an outer peripheral surface, said filler being carried on said cable with the end of the cable protruding therefrom, a rigid terminal housing having an internal wall surface, said cable and filler extending into said housing, facing portions of said wall surface and the peripheral surface of said filler in its unstressed state diverging in a direction extending longitudinally of said filler towards one end thereof, and means for applying gradually increasing force on said filler to move said diverging surfaces into substantially air-free interfacial engagement with one another, said engagement progressively expanding along the length of the filler in the direction of divergence of said surfaces as said force is increased.

2. Apparatus as defined in claim 1 wherein said peripheral surface of said filler tapers from an enlarged diameter portion to a reduced diameter portion, said wall surface of said housing having a mean diameter intermediate that of said enlarged diameter and reduced diameter portions of said filler.

3. Apparatus as defined in claim 1 wherein said filler includes a first member of dielectric material having a conical end surface remote from said cable end slopping outwardly from said cable toward said cable end, and a second member of conducting material having a surface seating against the conical end surface of said first member.

4. Apparatus as defined in claim 1 wherein said force-applying means includes resilient means acting against one end of said filler.

5. Apparatus as defined in claim 3 wherein said force-applying means includes a cuplike member of conducting material acting against said second member of conducting material of said filler.

6. In combination with an electrical cable, apparatus for terminating the end of said cable comprising a removable, preformed, tubular elastic filler having a central bore and an outer peripheral surface, said filler being carried by said cable with the cable end protruding therefrom, a rigid terminal housing having an internal wall surface, said cable and filler extending into said housing with a portion of said peripheral surface facing a portion of said wall surface, at least one of said surface portions when in the unstressed state of the elastic filler being angularly tapered to diverge away from the other facing portion, and means engaging said filler to apply a gradually increasing force for first urging said peripheral surface into interfacial contact with said wall surface around an initial portion thereof extending much less than the length of said filler and for thereafter increasing said contact along the length of said filler in the direction of angular divergence between said surface portions.

7. In combination, an electrical cable, apparatus for terminating the end of said cable comprising a rigid terminal housing including means defining a cylindrical cavity, a preformed, tubular, dielectric elastic filler having a central bore and an outer peripheral surface, said peripheral surface of the filler in its unstressed state gradually tapering from an enlarged diameter portion having a diameter greater than that of said cavity to a smaller diameter portion having a diameter less than that of said cavity, said filler being carried by said cable with said cable end protruding beyond said filler, said cable and filler extending into said housing with said enlarged diameter portion engaging said cavity defining means along a ringlike area adjacent said enlarged diameter portion, and force-applying means for gradually urging the tapered portion of said filler transversely outward into air-free interfacial engagement with said cavity defining means along an area progressively expanding from said ringlike area along the length of the filler, said filler including a first member of dielectric material having a conical surface at the end thereof remote from said cable end, said conical surface sloping outwardly from said cable toward said cable end, said filler further including a second member of conducting material having an end surface seating against said conical surface, said force applying means comprising a conductive end fitting having an inner wall surface electrically connected to said second member and cooperating with said terminal housing to form an enclosure for the filler and the end of said cable.

8. In combination, an electrical cable of the type having a central conductor, apparatus for making connection to the end of said cable comprising means for electrically connecting the central conductor of said cable to the conductor of another cable; a preformed tubular, elastic filler carried on said connected cables and positioned to extend in both directions from the connection therebetween, said filler including an outer peripheral surface having an enlarged diameter central portion and tapering in opposite directions therefrom to reduced diameter portions, and means including a pair of housings movable together to form an enclosure for said filler, each of said housings including an internal wall for applying force to said filler and including internal wall surfaces having a diameter intermediate that of said enlarged and reduced diameter portions of said filler, for applying forces transversely of said filler in a limited area adjacent said junction forcing said filler into substantially air-free interfacial contact with said cables, said area expanding along the length of said filler in opposite directions as said force is increased, said filler further including a central filler member of dielectric material extending between said reduced diameter portions, said central portion including a pair of conical end surfaces extending inwardly toward said cable and outwardly in opposite directions from said reduced diameter portions, and a pair of outer filler members of conducting material disposed at opposite ends of said central member, each of said outer members including a concave conical end face seated against a conical end surface of said central member.

9. Apparatus as defined in claim 8 including resilient means acting between said housings and said outer conducting members of said filler.

10. In combination, an electrical cable, apparatus for use in making connection to said cable, said apparatus comprising a preformed, tubular, elastic insulating member having a central bore extending therethrough for accommodating said cable and an outer peripheral surface gradually tapering from an enlarged diameter portion to a smaller diameter portion adjacent one end, said filler including a conical surface at one end tapering outwardly of said central bore toward the opposite end of said filler, said filler including a preformed, elastic conducting member having a central bore therein for accommodating said cable and also having a portion seating firmly against said conical surface of said insulating member.

11. In combination, an electrical cable, apparatus for use in making connection to said cable, said apparatus comprising a preformed, tubular elastic filler having a central bore therethrough for accommodating said cable, said filler member including an enlarged diameter central portion and a pair of peripheral surfaces extending in opposite directions therefrom and tapering gradually inwardly toward a pair of reduced diameter portions, said filler including a central member extending between said reduced diameter portions constructed of dielectric material and a pair of outer tubular members disposed at opposite ends of said central member and constructed of conducting material, each of said outer members including a concave conical face seated against a convex conical end face formed on said central member.

12. Apparatus for making a connection to the end of an electrical cable comprising: removable tubular elastic filler means slidable onto said cable, housing means for receiving said cable and said filler means and having a wall portion surrounding said filler means and so arranged that initially only a portion of the peripheral surface of said filler means extending much less than the length thereof is engaged in interfacial contact with said wall portion; and means for applying end force to said filler means to deform the latter and cause said interfacial contact to progressively expand along the length of said filler means toward one end, thereby to exclude air from between the peripheral surface of said filler means and said wall portion.

13. Apparatus for making a connection to the end of an electrical cable including: a removable tubular elastic filler slidable onto said cable, means for connecting the end of said cable to the end of another cable; means for centering said filler on said cables to surround end portions thereof, means for forming a region of high pressure in said elastic filler over a central portion thereof in an area extending around the cable and much less than the length thereof, means for progressively expanding said region along the length of the filler means toward opposite ends thereof to expel air from between said filler means and the cables, a pair of housing members slidable onto said filler from opposite ends thereof and having wall portions surrounding said filler means and so arranged that initially only a portion of the peripheral surface of said filler means extending much less than the length thereof is engaged in a ring-like region of interfacial contact with the wall portions, and wherein the last mentioned means includes means for moving said housing members toward each other to contact adjacent the central portion of said filler means, thereby progressively expanding said region of contact toward opposite ends of said filler to exclude air from said region.

References Cited by the Examiner

UNITED STATES PATENTS 2,280,711    4/1942    Machlett et al. _____ 174—75 X

FOREIGN PATENTS 204,105    6/1959    Austria.

LEWIS H. MYERS, *Primary Examiner.*

LARAMIE E. ASKIN, *Examiner.*

J. F. RUGGIERO, *Assistant Examiner.*